Patented Mar. 14, 1944

2,344,018

UNITED STATES PATENT OFFICE 2,344,018

SUBMARINE PAINT

Erich Baumheier, Oschatz-Zschollau, Germany; vested in the Alien Property Custodian No Drawing. Application March 8, 1941, Serial No. 382,445. In Germany January 24, 1940

7 Claims. (Cl. 260—736)

This invention relates to an improved submarine or underwater painting for the hull of vessels, for bridges, and for any other submarine constructions or underwater structures consisting, e. g., of brickwork, wood, concrete or iron.

It is an important object of the present invention to provide a paint by which aquatic or marine animals or plants are efficiently prevented from growing to the underwater surfaces.

A special object of the invention is to provide a paint which is not reduced in efficiency by the fact that marine animals, such as, shells and lepadides may get accustomed to the antidote or poison contained in the paint.

Another object of the invention is to provide a paint of a very uniform composition.

With these and further objects in view which will be apparent from the following disclosure, my paints contain an admixture of the poisonous substance contained in croton oil which is sometimes referred to also as physic-nut oil. I have found that paints containing said poisonous substance are extremely efficient with a view to preventing adhesion of organic matter to the painted underwater structure.

Any paints which are suitable as an anti-fouling or underwater painting may be used in connection with the invention. In order to incorporate the poisonous matter in the paint, the croton oil proper may be admixed thereto. However, since this oil contains only comparatively small proportions of active poisonous substance, I prefer adding the poisonous matter after its separation from the croton oil.

According to a further feature of the invention, a powder material such as carbon, especially in the form of charcoal, kieselguhr, alumina or the like, whose particles offer large active surfaces may be charged with the poisonous constituent of the croton oil and admixed to the paint. Such powder admixtures do not produce any substantial difference as to the effect of the poisonous matter, however, the production of the poisonous matter which does not form part of the present invention, is substantially facilitated. The poisonous matter which is sensitive to heat, is originally obtained in the form of a solution in methanol or the like and has to be extracted from the solution by vacuum evaporation. Said vacuum evaporation can be avoided, however, by extracting the poisonous matter from the solution by shaking with substances having large active surfaces, such as carbon or charcoal, kieselguhr and alumina.

It is also possible to embody in the paint a larger percentage of said poisonous matter by at least partly substituting croton oil for the normal binder of the underwater paint. Moreover, the paints in addition to croton oil or its poisonous matter may contain any of the customary anti-adhesion substances, such as copper or mercury compounds, organic or inorganic arsenic compounds, organic acids or the salts thereof, phenols or phenol derivatives.

I have found that the poisonous matter of croton oil as to its adhesion preventing effect in submarine paints excels the conventional substances which were so far admixed for this purpose. Compared to copper or mercury compounds the poisonous matter of the croton oil offers the advantage that it can be distributed more readily and more uniformly in submarine paints.

The excellent properties of the poisonous matter of the croton oil are probably due to the fact that this poisonous matter on the one hand is only slightly soluble in water, so that it remains active for a long time, while on the other hand it can be dissolved completely and evenly distributed, e. g., in varnish, so that fresh poisonous matter is laid bare on the surface as the paint is gradually rubbed off.

A special advantage of the invention resides in the fact that any adaptation of the organisms producing the deposits, such as is possible with the conventional antidotes, is precluded with the poisonous matter of croton oil.

The poisonous matter may be extracted from the croton oil by shaking the croton oil with methanol, as described in E. Baumheier, Inaug.-Dissertation Leipzig, 1932. To this end, 100 kgs. of croton oil may be intensively stirred for ten hours with 100 liters of absolute methanol in a closed stirring device, at room temperature. The liquid is then let stand until the methanol has been clearly separated from the oil, and the oil is removed by a siphon. The methanol solution is then evaporated at 50° C., under vacuum and carbon dioxide current. The methanol may be used over and over again. The poisonous matter of the oil is left behind by evaporating the methanol. The evaporating process may be avoided by extracting the poisonous from the solution by means of substances having large active surfaces, such as, carbon, especially in the form of charcoal, kieselguhr, alumina.

Example 1.—The sumbmarine or anti-fouling paint consists of 60 parts of coumarone resin, 90 parts of tetrahydronaphthalene, 36 parts of a chlorinated caoutchouc-benzol solution (33 percent caoutchouc, 67 percent benzol), 20 parts of croton oil, 75 parts of Turkey red or purple oxide of iron (Fe₃O₃) and 25 parts of active carbon or charcoal charged with ammonia (all by weight).

*Example 2.*—The underwater paint is prepared by admixing 180 parts tetrahydronaphthalene, 120 parts coumarone resin, 72 parts of a solution of chlorinated caoutchouc in benzol in a proportion of 1:2, 150 parts of Turkey red oxide of iron and 60 parts of active carbon or charcoal charged with about 3 percent of the poisonous matter of croton oil (all by weight).

*Example 3.*—The paint is made from 100 parts of croton oil, 40 parts of chlorinated caoutchouc dissolved in benzol in a proportion of 1:2, 100 parts of purple oxide of iron, 1 part lead manganese naphthenate, 0.5 part cobalt naphthenate and a proportion of tetrahydronaphthalene sufficient to make the paint ready for use.

The method of the present invention has been described in detail with reference to specific embodiments. It is to be understood, however, that the invention is not limited by such specific reference but is broader in scope and capable of other embodiments than those specifically described.

Where the binder is partly replaced by croton oil, the croton oil or its poisonous constituent should be added in a proportion sufficient to substitute the amount of binder which is lacking from producing satisfactory binding action.

I claim:

1. An underwater paint comprising coumarone resin, tetrahydronaphthalene, chlorinated caoutchouc dissolved in benzol, a repellent of the class consisting of croton oil and the methanol-soluble extract thereof, red oxide of iron and charcoal charged with ammonia.

2. An underwater paint comprising coumarone resin, tetrahydronaphthalene, chlorinated caoutchouc dissolved in benzol, croton oil, red oxide of iron and charcoal charged with ammonia, in proportions by weight not substantially varying from the numbers 60, 90, 36, 20, 75 and 25, respectively.

3. An underwater paint comprising tetrahydronaphthalene, coumarone resin, chlorinated caoutchouc dissolved in benzol, red oxide of iron and active carbon charged with about 3 percent of the methanol-soluble constituent of croton oil.

4. An underwater paint comprising tetrahydronaphthalene, coumarone resin, chlorinated caoutchouc dissolved in benzol, red oxide of iron and active carbon charged with about 3 percent of the methanol-soluble constituent of croton oil, said substances being contained in proportions by weight not substantially varying from the following ratio, viz., 180:120:72:150:60, respectively.

5. An underwater paint comprising croton oil, chlorinated caoutchouc dissolved in benzol at a ratio of 1:2, red oxide of iron, lead manganese naphthenate, cobalt naphthenate and tetrahydronaphthalene.

6. An underwater paint comprising croton oil, chlorinated caoutchouc dissolved in benzol at a ratio of 1:2, red oxide of iron, lead manganese naphthenate, cobalt naphthenate, said substances being contained in proportions by weight not substantially varying from the figures 100, 40, 100, 1, 0.5, and a proportion of tetrahydronaphthalene adapted to make the paint ready for use.

7. An underwater paint comprising red oxide of iron, coumarone resin, a benzol solution of chlorinated caoutchouc, a vehicle and a repellent of the class consisting of croton oil and the methanol-soluble extract thereof.

ERICH BAUMHEIER.